2,969,852
Patented Jan. 31, 1961

2,969,852
PROCESS FOR REMOVING NIOBIUM OXYCHLORIDE FROM NIOBIUM PENTACHLORIDE

Howard W. Jacobson, Wilmington, Del., assignor to E. I. du Pont de Nemours and Company, Wilmington, Del., a corporation of Delaware No Drawing. Filed June 18, 1959, Ser. No. 821,116

3 Claims. (Cl. 183—114.2)

This invention relates to the purification of niobium pentachloride. Particularly the invention relates to a method for the removal of oxygen-containing compounds, especially niobium oxychloride, from niobium pentachloride.

The development of many new uses for niobium metal has resulted in recent improvements in methods for the production of this metal. However, it has been found that very small amounts of oxygen in niobium metal have the effect of hardening and embrittling the metal so as to make it difficult, or in many cases impossible, to fabricate. One of the most important of the methods for the preparation of niobium metal is by the reduction of niobium pentachloride with hydrogen. The pentachloride of niobium is usually obtained by the chlorination of naturally occurring oxidic ores of this metal. It is well known that the oxychloride of niobium is also obtained by the chlorination of these oxidic ores, and the product of chlorination is generally a mixture of the pentachloride and the oxychloride. If the pentachloride that is used for metal production is contaminated with oxygen-bearing compounds, and particularly with niobium oxychloride, the metal produced will be seriously degraded. This is because the oxygen-bearing compounds are retained as, or reduced to, niobium oxides in the product metal, and the metal is thereby made hard and difficult, or even impossible, to fabricate.

It is important, therefore, that for the production of niobium metal by methods that comprise the reduction of niobium pentachloride, only very pure pentachloride be used. Precautions must be taken to exclude from the pentachloride even very minor amounts of those oxygen-containing compounds which would contaminate the metal being produced. The present invention provides for the purification of niobium pentachloride to make it more valuable in the production of high-purity niobium metal.

It is known that carbon in the presence of chlorine or chlorine-containing reactants will bring about the further chlorination of niobium oxychloride to niobium pentachloride according to one or more of the following reactions:

(1) 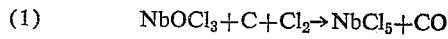     $NbOCl_3 + C + Cl_2 \rightarrow NbCl_5 + CO$ (2)      $NbOCl_3 + COCl_2 + C \rightarrow NbCl_5 + 2CO$ However, in these chlorination reactions it is necessary to have present an excess of chlorine in order to obtain a good yield of niobium pentachloride. Since chlorine cannot be tolerated in the reactor in which the pentachloride is reduced to metal, it is necessary to condense the niobium pentachloride to separate it from the unreacted and product gases. In this condensation of niobium pentachloride, some oxychloride will also condense even under optimum conditions of chlorination. This invention deals with the removal of niobium oxychloride and other contaminating oxygen-containing compounds.

The desirable object of this invention is attained by means of the preferential adsorption of oxygen-containing niobium compounds on the surface of activated carbon.

I have found that if activated carbon is contacted with the mixture of niobium oxychloride and niobium pentachloride, the niobium oxychloride will be held preferentially on the activated carbon surface and the niobium pentachloride will be obtained free from all except minute traces of contaminating oxychloride.

Activated carbon is a well known material, and numerous descriptions of its preparation are given in the literature. Literature references which adequately describe the preparation of the activated carbon used in this invention may be found in "Industrial Chemistry" by E. R. Riegel, 3rd edition, p. 589 (1937); or in "Industrial Chemistry of Colloidal and Amorphous Materials," by Lewis, Squires, and Broughton (1943), pp. 74, 75. The preparation of activated carbon consists essentially of removing adsorbed hydrocarbons from a porous amorphous-base carbon which is usually obtained by simple low-temperature distillation of a carbon-containing material, such as nutshells or wood. The removal of adsorbed hydrocarbons is usually accomplished by a combined oxidation and distillation involving the use of steam or the use of steam and air. The carbon that results from this treatment is of extremely high surface area and for the purposes of this invention will be considered to be carbon having a surface area in excess of 500 square meters per gram.

In carrying out the process of my invention, the preferred temperature range for contacting the niobium chloride mixture with the activated carbon is above the boiling point of the pentachloride and below the sublimation point of the oxychloride. At a preferred operating pressure of about 1 atmosphere, this temperature range would be 255° C.–340° C. Although operation within this temperature range is preferred, separation may be obtained over a wider temperature range of from about 205° C.–500° C. However, operation at temperatures above about 340° C. is less desirable because of the higher heating costs involved, and because less than the maximum degree of separation will take place when the temperature is above the sublimation temperature of the niobium oxychloride contaminant.

To carry out the process of my invention, it has been found that it is necessary only to pass the mixed chlorides through a bed of activated carbon which is held at a temperature within the ranges given above, in order to have the activated carbon preferentially adsorb the oxychloride, thus preparing purified niobium pentachloride. In a preferred method of operation, the purified niobium pentachloride will be fed directly to a reduction unit to be used for the production of high-purity Nb metal.

To further illustrate the process of the invention, the following examples are given. These are for purposes of illustration only and are not to be interpreted as in limitation of my invention:

Example I

A 15 mm. (diameter) Pyrex tube was packed with a 10 gram sample of "Norit C" activated charcoal (−60 +80 mesh) which had previously been dried by heating at 400° C. for 2 hours in vacuum. The packed carbon bed was heated to 300° C. and held at this temperature. Sixty-eight grams of niobium pentachloride containing 0.2% niobium oxychloride was volatilized over a period of 4 hours, from a boiler the temperature of which was kept at 260° C. Essentially all of the niobium pentachloride-containing oxychloride was volatilized from the boiler during this time, the contaminants being carried to the carbon bed along with the pentachloride.

The product gas emanating from the activated carbon bed was fed directly to a reactor tube comprising a bubbling bed of niobium particles, where it was reduced to metal by means of hydrogen, the reaction being carried out over a 4-hour period at a temperature of 800° C. and a hydrogen to niobium pentachloride mol ratio of 115 to 1. The product metal was deposited on the bed particles. The metal thus produced contained only 0.006% oxygen, showing that the reactant niobium pentachloride contained only very minute traces of oxygen-containing niobium compounds. The oxygen analysis was made by vacuum fusion.

The same experiment was repeated using another portion of the same niobium oxychloride-contaminated pentachloride as the feed material, and the same temperature, but feeding the volatilized mixed chlorides directly to the hydrogen-reduction unit for reduction to metal, as given in the first part of this example, thus by-passing the activated carbon-packed bed. The sample of niobium prepared in this experiment without the use of activated carbon to purify the niobium pentachloride, was found to contain 0.025 percent oxygen when analyzed by the same method as was the metal of the first part of this example. According to published vapor pressure data, straight volatilization of the mixed chlorides of the composition given would effect at 260° C. only about a 5% reduction in the oxychloride content.

*Example II*

In another experiment, a 22 mm. (diameter) Pyrex tube was packed for a length of 10 inches with "Norit C" activated carbon of −60 +80 mesh particle size. This carbon had previously been dried in vacuum for 2 hours at a temperature of 400° C. The intake side of this packed carbon bed was connected to a niobium pentachloride boiler, and the outlet side was connected to a conductivity cell, which has been found to be a practical means of determining the purity of $NbCl_5$ with respect to $NBOCl_3$.

The specific resistance of a sample of niobium pentachloride has been found to be a function of the purity of the sample. Using a conductivity cell with one-centimeter platinum electrodes, pure niobium pentachloride was found to have a specific resistance of $6.3 \times 10^6$ ohm-cm. at 220° C. By addition of definitely known amounts of niobium oxychloride to pure niobium pentachloride and plotting the results of conductivity tests, it has been possible to obtain a means of very accurately determining the degree of $NBOCl_3$ contamination in $NbCl_5$. Using this conductivity cell analysis procedure, a sample of niobium pentachloride was found to contain 0.93% niobium oxychloride.

Sixty grams of this niobium pentachloride containing 0.93% niobium oxychloride was placed in the vaporizer connected to the packed carbon bed, and heated to a temperature of 260° C. The temperature of the carbon bed was maintained at 300° C. throughout the experiment. Under these conditions, the gas passed through the carbon bed from the vaporizer was led into the conductivity cell and its specific resistance was determined. This was found to be $25 \times 10^6$ ohm.-cm., corresponding, from the plot mentioned above, to a content of only 0.14% niobium oxychloride in the niobium pentachloride.

Although the particle size of the activated carbon in these examples was −60 to +80 mesh, other experiments have been carried out in which the particle size has varied from −30 to +200 mesh. It has been found that the particle size of the activated carbon used is not a critical factor in the operation of the invention, but is a limiting factor in the rate of flow of the gases through the bed. A coarse particle size allows operation at a low pressure-drop across the bed.

In the operation of the invention, it is necessary that a carbon of high-surface area, that is to say an activated carbon, be used. The activated carbon used in the above examples has a surface area in the range of about 1100 m.²/g. When the process of the invention was carried out using a commercial carbon of low surface area (surface area 50 m.²/g.) essentially no separation of oxychloride was obtained over that normally expected from the vapor pressure data given above.

As would be expected, the effectiveness of the separation at a given temperature and total pressure and for a given activated carbon bed is somewhat dependent on the ratio of $NbCl_5$ and $NbOCl_3$ partial pressures. When the ratio $P_{NbCl_5}/P_{NbOCl_3}$ is very high, good separation has been achieved using relatively small amounts of activated carbon. With lower ratios, more carbon must, of course, be used. Under these conditions, the yield loss of Nb values as $NbCl_5$ will increase. It follows from these considerations that if the carbon bed is sufficiently long, this invention may be used when the niobium pentachloride contains niobium oxychloride as a contaminant at levels of up to about 3% $NbOCl_3$. However, a better separation will result and a very pure niobium pentachloride product will be obtained if the niobium oxychloride is present at a level of about 1% or less.

If it is desirable to recover the activated carbon for re-use, the niobium values adsorbed thereon may be removed by purging with an inert gas, as for example argon, or by passing chlorine or a chlorine-containing gas, such as phosgene, over the carbon bed at a temperature of, say, about 300° C. to 500° C. Or, if an alternate method of recovering the niobium values and of regenerating the carbon bed is preferred, the adsorbed niobium pentachloride may be washed from the activated carbon, using methanol. The carbon surface from which the niobium values have been removed by any of these methods is found to be almost as efficient as an adsorbent after such treatment as it was in the first operation.

Although it is possible to re-use the carbon surface after such removal of adsorbed niobium values, a practical method of operation is to use the activated carbon with the adsorbed niobium values as a feed material for the primary chlorination operation described by reactions 1 or 2 or both, set forth above.

Since it is obvious that many changes and modifications can be made in the above-described details without departing from the nature and spirit of the invention, it is to be understood that the invention is not to be limited to said details except as set forth in the appended claims.

I claim:

1. A process for the removal of niobium oxychloride occurring as a contaminant in niobium pentachloride, said process comprising passing the mixed chlorides through a bed of activated carbon at a temperature in the range of about 205° C. to about 500° C. to effect preferential adsorption of the niobium oxychloride on the activated carbon.

2. The process of claim 1 in which the temperature of the activated carbon bed is between 255° C. and 340° C. and in which the amount of niobium oxychloride present in the mixed chlorides does not exceed 3 mol percent.

3. A process for the removal of niobium oxychloride occurring as a contaminant in niobium pentachloride, said process comprising contacting the mixed chlorides with activated carbon at a temperature that is above the boiling point of niobium pentachloride and below the sublimation point of niobium oxychloride to effect preferential adsorption of the oxychloride on the activated carbon.

No references cited.